United States Patent [19]

Hodges

[11] Patent Number: 5,121,473
[45] Date of Patent: Jun. 9, 1992

[54] PIPELINED SYSTEM INCLUDES CORRECTION MECHANISM OPERATED ON HISTORY INFORMATION IDENTIFYING CONDITIONAL JUMP INSTRUCTIONS FOR WHICH THE JUMP PREDICTION WAS INCORRECT ON PREVIOUS INSTANCES OF EXECUTION OF THOSE INSTRUCTIONS

[75] Inventor: Steven E. Hodges, Stockport, Great Britain

[73] Assignee: International Computers Limited, London, England

[21] Appl. No.: 474,297

[22] Filed: Feb. 2, 1990

Related U.S. Application Data

[63] Continuation of Ser. No. 270,078, Nov. 14, 1988, abandoned.

[30] Foreign Application Priority Data

Dec. 5, 1987 [GB] United Kingdom ............... 8728493

[51] Int. Cl.⁵ .............................................. G06F 9/38
[52] U.S. Cl. ........................ 395/375; 364/DIG. 1; 364/261.3; 364/261.5; 364/263.1; 364/255.7; 364/231.8
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 4,200,927 | 4/1980 | Hughes et al. | 364/200 |
| 4,370,711 | 1/1983 | Smith | 364/200 |
| 4,373,180 | 2/1983 | Linde | 364/200 |
| 4,390,946 | 6/1983 | Lane | 364/200 |
| 4,430,706 | 2/1984 | Sand | 364/200 |
| 4,435,756 | 3/1984 | Potash | 364/200 |
| 4,477,872 | 10/1984 | Losq | 364/200 |
| 4,594,659 | 6/1986 | Guenthner et al. | 364/200 |
| 4,604,691 | 8/1986 | Akagi | 364/200 |
| 4,679,141 | 7/1987 | Pomerene | 364/200 |
| 4,755,935 | 7/1988 | Davis et al. | 364/200 |
| 4,760,520 | 6/1988 | Shintani et al. | 364/200 |
| 4,763,245 | 8/1988 | Emma et al. | 364/200 |
| 4,764,861 | 8/1988 | Shibuya | 364/200 |
| 4,764,866 | 8/1988 | Downey | 364/200 |
| 4,777,594 | 10/1988 | Jones et al. | 364/200 |
| 4,853,840 | 8/1989 | Shibuya | 364/200 |
| 4,984,154 | 1/1991 | Hanatani et al. | 364/200 |

*Primary Examiner*—Thomas C. Lee
*Assistant Examiner*—Mehmet Geckil
*Attorney, Agent, or Firm*—Lee, Mann, Smith, McWilliams, Sweeney & Ohlson

[57] ABSTRACT

A jump prediction circuit predicts the outcome of a conditional jump instruction and is of particular use in a pipelined processor. An initial guess is formed, based on the value of the jump parameter in the instruction. A random-access memory stores the history of the outcome of previously executed jump instructions and is used, when valid, to correct the initial guess to produce a final jump prediction.

5 Claims, 2 Drawing Sheets

PIPELINED SYSTEM INCLUDES CORRECTION MECHANISM OPERATED ON HISTORY INFORMATION IDENTIFYING CONDITIONAL JUMP INSTRUCTIONS FOR WHICH THE JUMP PREDICTION WAS INCORRECT ON PREVIOUS INSTANCES OF EXECUTION OF THOSE INSTRUCTIONS

This application is a continuation of application Ser. No. 270,078, filed Nov. 14, 1988 now abandoned.

BACKGROUND TO THE INVENTION

1. Field of the Invention

This invention relates to apparatus for predicting the outcome of jump (branch) instructions.

The invention is particularly, although not exclusively, concerned with jump prediction in a pipelined data processing system.

2. Background Information

In a data processing system, instructions are normally executed sequentially. However, a jump instruction can specify that a jump is to be made out of this normal sequence. The jump instruction may be unconditional, which means that a jump is made whenever the instruction is executed. Alternatively, the jump instruction may be conditional, which means that a jump is made only if a specified condition (e.g. the contents of an accumulator register are greater than zero) is satisfied. A jump instruction may be absolute, which means that a jump is made to a specified absolute address. Alternatively, the jump instruction may be relative, which means that a jump is made to an address displaced by a specified amount from the current instruction.

In the case of a pipelined processor, conditional jump instructions present a particular problem. In general, the actual condition upon which the jump depends will not be available until the instruction approaches the end of the pipeline. If the condition indicates that a jump is to be made, then all later instructions that have been started in the pipeline will be invalid and must be abandoned. Clearly, this slows down the operation of the system.

One way of reducing the problem is to attempt to predict the likely outcome (jump/no jump) of the conditional jump instruction, and to prefetch the next instruction into the pipeline on the basis of this prediction. If the predictions are correct, then it is not necessary to abandon any subsequent instructions and so the operation of the pipeline can continue without any hold-ups.

One way of predicting the outcomes of jump instructions is to maintain a table which records the outcomes of previously executed jump instructions at given memory locations. Whenever a jump instruction is encountered at one of these given memory locations, the table is accessed to provide a prediction, on the assumption that the outcome will be the same as last time the instruction was executed. One such prediction mechanism is described in U.S. Pat. No. 4,477,872.

One object of the present invention is to provide an improved apparatus for predicting the outcome of conditional jump instructions.

SUMMARY OF THE INVENTION

According to the invention there is provided data processing apparatus comprising:

(a) an instruction fetching unit for fetching a series of instructions, including conditional jump instructions.

(b) an execution unit for executing the series of instructions. and (c) a prediction unit for predicting the outcomes of execution of the conditional jump instructions on the basis of a stored history of previous occurrences of those instructions.

wherein a stored history is not available for a particular conditional jump instruction, the prediction means predicts the outcome of that instruction on the basis of an internal attribute of that instruction.

BRIEF DESCRIPTION OF THE DRAWINGS

One embodiment of the invention will now be described by way of example with reference to the accompanying drawings.

DESCRIPTION OF THE PREFERRED EMBODIMENT OF THE INVENTION

Figure 1:
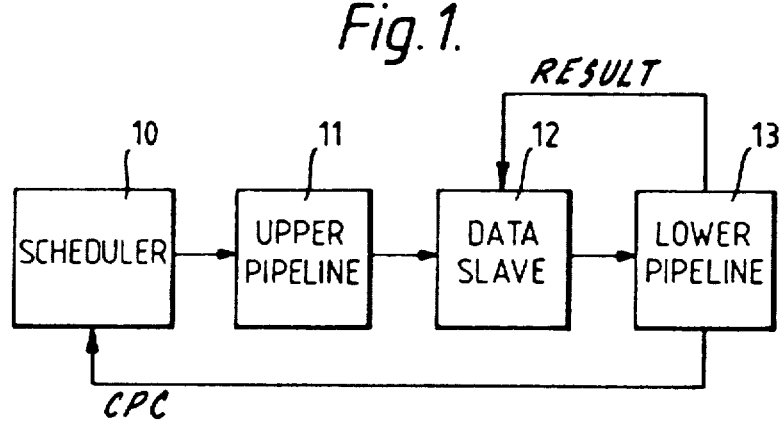
FIG. 1 is an overall view of a pipelined data processing system, including an instruction scheduler.

Referring to FIG. 1, this shows a pipeline processing system comprising four pipeline units as follows: an instruction scheduler 10, an upper pipeline unit 11, a data slave 12, and a lower pipeline unit 13. Each of these pipeline units itself comprises a sub-pipeline, consisting of a number of pipeline stages connected together in series.

The scheduler 10 prefetches a series of instructions and passes them to the upper pipeline 11. Normally, the instructions are fetched sequentially, from consecutive memory locations. In the case of certain conditional jump instructions, the scheduler 10 makes a prediction of the likely outcome of the instruction, and prefetches the next instruction on that basis, as will be described.

The upper pipeline 11 receives instructions from the scheduler 10 and processes them so as to generate operand addresses. The addresses are passed to the data slave 12.

The data slave retrieves the operands, if necessary by retrieving them from a main memory (not shown). The retrieved operands are passed to the lower pipeline 13.

The lower pipeline 13 performs arithmetic or logic operations on the operand, as specified by the instruction, the result being used to update an internal register or written back into the data slave and/or the main memory. In the case of a conditional jump instruction, the lower pipeline 13 detects whether or not a specified jump condition has been satisfied, and hence decides whether or not a jump should have been made. If the scheduler 10 made a wrong prediction for this instruction, then the subsequent instructions in the pipeline are abandoned, and the lower pipeline 13 supplies a corrected program counter value CPC to the scheduler, to cause it to fetch the next instruction.

The upper pipeline, data slave, and lower pipeline may all be conventional units and so it is not necessary to describe them in any further detail. The scheduler will be described in more detail below.

INSTRUCTION FORMAT

The instructions may be either in 16 bit (half-word) or 32-bit (full word) format.

The instructions are fetched from the memory in double-word blocks (i.e. four half-words). Each block may contain a mixture of 16-bit and 32-bit instructions. The instructions are all aligned with half-word boundaries in the block, but the 32-bit instructions are not necessarily aligned with the full-word boundaries. Hence, a 16-bit instruction, or the first half of a 32-bit instruction, can lie in any half-word location.

Full details of the instruction format may be obtained from "The ICL 2900 series" by J. K. Buckle, MacMillan Press Ltd, 1978.

Each instruction contains a function code F which indicates the operation to be performed by the instruction. These include the three relative conditional jump function codes JCC (jump on condition code), JAT (Jump on arithmetic condition true) and JAF (jump on arithmetic condition false).

Each instruction also contains a parameter N. In the case of a relative literal jump, this parameter is interpreted as a displacement value, to be added to the current instruction address to produce the jump destination address. The displacement may be either positive or negative, so that the jump may either be forward or backward.

SCHEDULER

Figure 2:
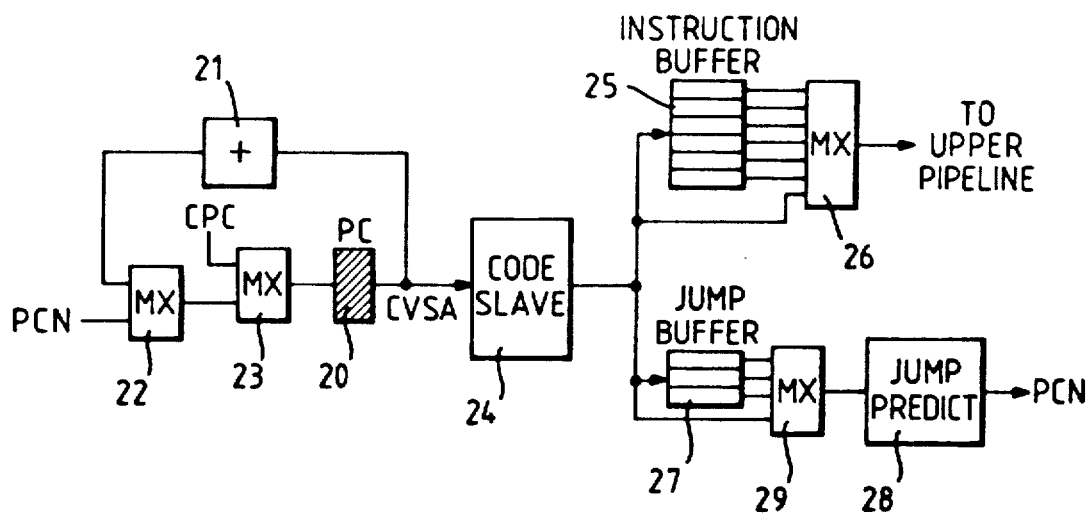
FIG. 2 shows the instruction scheduler in more detail.

Referring now to FIG. 2, this shows the instruction scheduler 10 in greater detail.

The scheduler includes program counter (PC) register 20, which produces an instruction prefetch address CVSA indicating the address of the next block of instructions to be prefetched.

The contents of register 20 are normally incremented at successive clock beats by means of an adder circuit 21, and then written back into the register 20, so as to cause blocks of instructions to be prefetched sequentially. However, if a jump is predicted, a multiplexer 22 is switched, and this causes a predicted jump destination address PCN to be loaded into the register 20. Alternatively, in the case of a wrongly predicted jump detected by the lower pipeline 13, a multiplexer 23 is switched so as to load the corrected program counter value CPC into the register 20. In either case after the register 20 has been updated by PCN or CPC, normal sequential addressing continues.

The instruction prefetch address CVSA is applied to a code slave store 24, so as to retrieve a 2-word block (64 bits) of instruction data from the code slave. If the required block is not present in the code slave, it is retrieved from the main memory (not shown) and loaded into the code slave 24.

Each block of instructions retrieved from the code slave is written into an instruction buffer 25, which holds six double-word blocks. Instructions are read out of the instruction buffer sequentially by way of a multiplexer 26, and passed to the upper pipeline unit 11. If the instruction buffer is empty, the multiplexer 26 is switched so as to allow the next instruction from the code slave to by-pass the instruction buffer.

Each block of instructions from the code slave is also written into a jump buffer 27, having three double-word block locations. The jump buffer is smaller than the instruction buffer because the information in it is processed more rapidly and retention of code is unnecessary in this buffer. The double-word blocks are read out sequentially from the jump buffer 27 by way of a multiplexer 29, and passed to a jump prediction circuit 28. If the jump buffer 27 is empty, the multiplexer 29 is switched so as to cause the next block to be fed directly to the prediction circuit 28, by-passing the buffer 27. The jump prediction circuit 28 produces the predicted jump destination address PCN.

It should be noted that the jump buffer normally processes instructions well in advance of the instruction buffer. This allows jump to be predicted and code fetched before the instruction buffer is empty as a result of the jump, or at least reduces the empty time to a minimum.

JUMP PREDICT CIRCUIT

Figure 3:
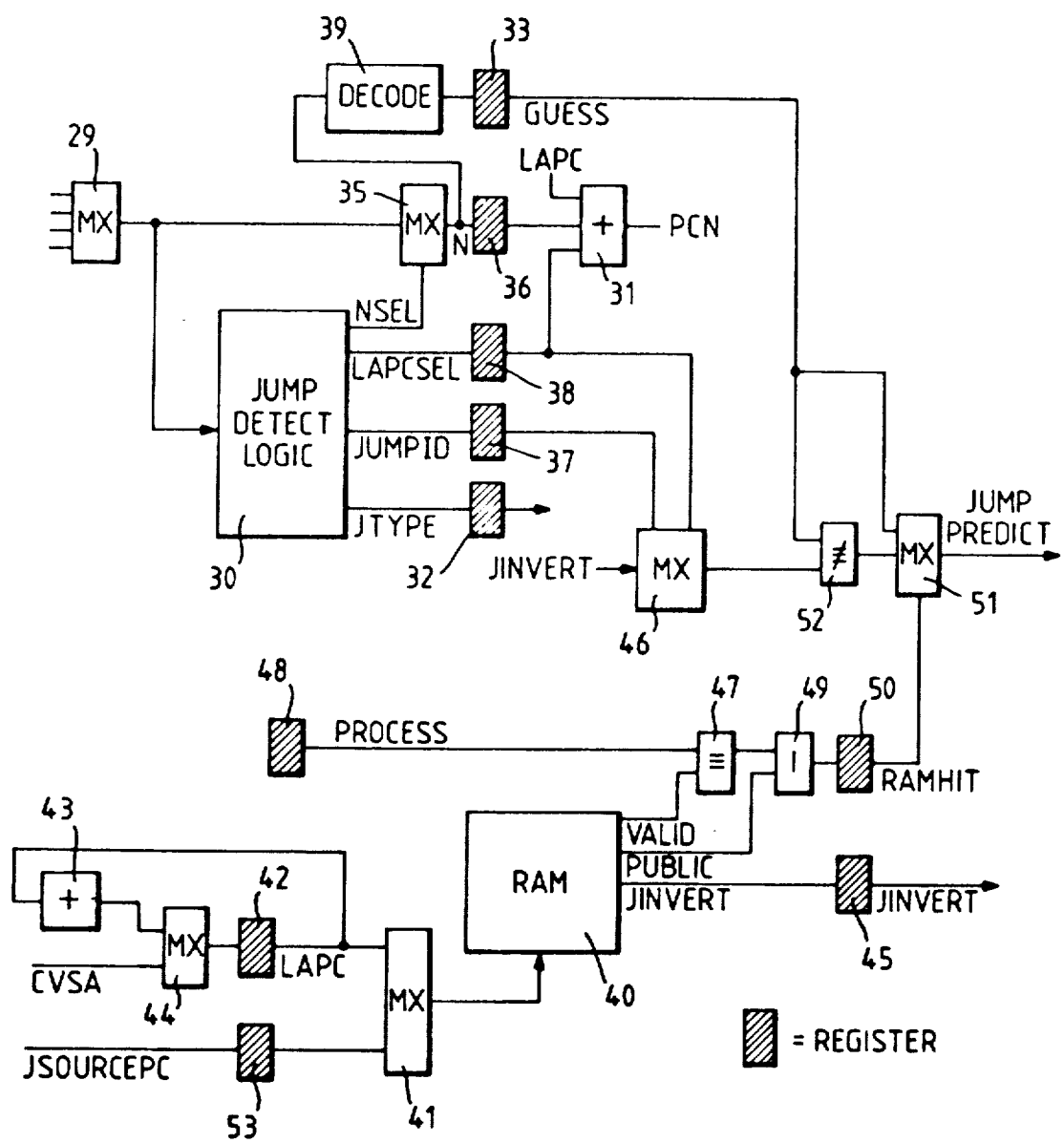
FIG. 3 shows a jump prediction circuit forming part of the instruction scheduler.

Referring now to FIG. 3, this shows the jump predict circuit 28 in detail.

As mentioned above, the jump prediction circuit receives a double-word block of instructions from the jump buffer or from the by-pass around the buffer.

The double word block is applied to a jump detection logic circuit 30, which decodes the contents of the block, so as to determine the position of each relative jump instruction (if any) in the block. The circuit 30 produces the following output signals (1) A two-bit signal LAPCSEL. This indicates the half-word location of the start of the currently detected relative jump instruction, and is stored in a register 38.

(2) A two-bit signal NSEL. This indicates the position of the parameter N of the detected relative jump instruction. NSEL is used to control a multiplexer 35 so as to select the specified parameter N, which is then loaded into a register 36. The selected N is added to a local program counter value LAPC, along with LAPCSEL, by means of an adder circuit 31 to produce the predicted jump destination address PCN.

(3) A two-bit signal JTYPE. This is stored in a register 32, and specifies the type of the detected jump instruction, as follows:

| JTYPE | Type |
|-------|------|
| 00 | Unconditional and literal |
| 01 | Conditional and literal |
| 10 | Unconditional and non-literal |
| 11 | Conditional and non-literal |

(4) A two-bit signal JUMPID which further specifies the jump instruction, as follows:

| JUMPID | TYPE |
|--------|------|
| 01 | JAT |
| 10 | JAF |
| 11 | JCC |
| 00 | Other |

The signal JUMPID is stored in a register 37.

The parameter N is decoded in a decoder circuit to produce a GUESS signal which represents a prediction of the outcome of the jump instruction, based on an internal attribute of the jump instruction. In this particular example, GUESS is true if N is less than 16. In other words, it is predicted that short forward jumps and all backward jumps will be made; conversely, longer forward jumps (with N greater than or equal to 16) will not be made. It has been found that this gives a correct prediction significantly more than 50% of the time. GUESS is stored in a register 33.

The jump prediction circuit also includes a random-access memory (RAM) 40 having 1024 locations. Each location holds 16 bits as follows:

| bits | name |
|------|------|
| 10-15 | JINVERT (0-5) |
| 2-9 | VALID (0-7) |
| 1 | PUBLIC |
| 0 | PARITY |

JINVERT (0-5) are "guess invert" bits which predict whether or not the GUESS signal produced for a particular jump instruction is correct. JINVERT (0-2) relate respectively to JAT, JAF and JCC instructions starting in word 0 of a double-word block, while JINVERT (3-5) relate respectively to JAT, JAF and JCC instructions starting in word 1 of a double-word block. Thus, for example, if JINVERT (0) is true, this indicates that a GUESS produced for a JAT instruction starting in word 0 is predicted to be incorrect, and hence must be inverted.

The RAM 40 is addressed by a 10-bit hash address formed from a 29-bit address from a multiplexer 41. In this example, the hash address is formed by taking a predetermined selection of ten out of the 9-bits. However, in other embodiments of the invention it may be formed for example by combining pairs of the address bits in exclusive —OR gates.

The multiplexer 41 normally selects the output LAPC of a register 42. This represents a local copy of the program counter PC, and indicates the address of the block currently being processed by the jump prediction circuit. The register 42 is normally incremented, in an adder circuit 43, each time a new block is processed by the prediction circuit. When the program counter PC is updated to perform a jump, a multiplexer 44 is switched so as to write the jump destination address (signal CVSA) into the register 42.

The contents of the addressed location of the RAM40 are read out and are used as follows.

The six guess invert bits JINVERT (0-5) are written into a register 45. The output of this register is in turn applied to the input of a multiplexer 46, controlled by the most significant bit of LAPCSEL, and the two bits of JUMPID. The multiplexer 46 thus selects the one of the guess invert bits corresponding to the current instruction type and position within the two word block. For example, if JUMPID indicates a JAT instruction and the most significant bit of LAPCSEL indicates that the instruction starts in word 0, then the multiplexer 46 selects JINVERT (0).

The VALID bits from the addressed location of RAM40 are compared in a comparator circuit 47 with the contents of a process tag register 48. The output of the comparator 47 is combined in an OR gate 49 with the PUBLIC bit from the addressed location of the RAM, to produce a signal RAMHIT which is stored in a register 50. Thus, it can be seen that RAMHIT is true if the VALID bits match the contents of the process tag register 48, or if the PUBLIC bit is set.

The process tag register 48 is incremented each time there is a change of process (program) in the system, and this effectively invalidates all the entries in the RAM 40 relating to different processes, except for those entries relating to shared public code, which are indicated by the PUBLIC bit.

The RAMHIT signal indicates whether or not the guess invert signals JINVERT(0-5) are to be taken as valid.

RAMHIT controls a multiplexer 51. When RAMHIT is true, the multiplexer 51 selects the output of an exclusive —OR gate 52 which combines the GUESS signal with the selected JINVERT bit from multiplexer 46. When RAMHIT is false, the multiplexer selects GUESS. The output of the multiplexer 51 is a JUMPPREDICT signal which indicates the predicted outcome of the jump instruction. Thus, it can be seen that if RAMHIT indicates that JINVERT is not valid, then the GUESS signal is used directly as the final prediction JUMPPREDICT. If, on the other hand, RAMHIT indicates that JINVERT is valid, then the final prediction JUMPPREDICT is formed by selectively inverting GUESS, according to the value of the appropriate JINVERT bit.

JTYPE is then used to determine the final action, as follows:

(1) If JTYPE=00, a jump is made to the predicted destination PCN.

(2) If JTYPE=01, a jump is made to PCN if JUMPPREDICT is true.

(3) If JTYPE = 10 or 11, no jump is made.

The way in which the RAM 40 is updated will now be described.

As indicated above, whenever the lower pipeline 13 detects an incorrectly predicted jump instruction, it sends a corrected program counter value CPC to the scheduler, so as to return to the correct sequence of instructions. At the same time, the lower pipeline sends the address JSOURCEPC of the jump instruction in question to the jump prediction circuit. This is loaded into a register 53 and is then used to address the RAM 40 by way of a multiplexer 41.

The appropriate one of the JINVERT bits of the currently addressed RAM location, according to the type and position of the jump instruction, is then inverted For example, if the incorrectly predicted jump instruction is a JAT starting in word 0, then JINVERT(0) is inverted.

At the same time, if the VALID bits in the addressed location match the process tag in register 48, the remaining JINVERT bits are written back unchanged into the addressed location of the RAM. If, on the other hand, the VALID bits do not match the progress tag, then these remaining JINVERT bits are all reset, the current process tag value is written into the VALID bits, and the PUBLIC bit is updated.

In summary, it can be seen that the system uses a two-level jump prediction mechanism. The first level of prediction provides the GUESS signal and is based on an internal attribute of the jump instruction itself. The second level of prediction is provided by the RAM 40, and is based on the history of the outcome of the jump instruction the last time it was performed. Specifically, the second level of prediction takes the form of an indication of whether the initial prediction provided by the GUESS signal was correct.

If the prediction provided by RAM 40 is not valid (RAMHIT false), for example because this particular jump instruction has not been encountered before, then the initial GUESS is used directly as a final jump prediction. However, if the RAM prediction is valid, then it is used to correct the initial GUESS to produce the final prediction.

It has been found that this two-level prediction mechanism is particularly advantageous in that it allows a prediction to be made even if there is no previously recorded history of the outcome of a particular instruction, while allowing a more accurate prediction when the history is available.

Taking the RAM contents to signify whether or not to invert the initial guess, rather than simply as a prediction to be substituted for the initial guess, allows several predictions to be stored in each line of the RAM.

Moreover, the fact that the RAM is written to only when a jump has been incorrectly predicted greatly reduces the number of write accesses to the RAM, and hence makes more effective use of the storage capacity of the RAM. It also reduces the possibility of "thrashing" i.e. the situation where two different instructions alternately set and reset the same JINVERT bit.

It should be noted that, because the RAM 40 is hash-addressed, several different instructions may map onto the same location of the RAM. As a result, some of the JINVERT outputs from the RAM may be spurious, in that they may related to a different instruction from that which is currently being processed by the prediction circuit. The possibility of such spurious outputs being used is reduced by the use of the VALID bits and the process tags, which invalidate locations in the RAM which relate to processes other than the current one. The possibility of spurious outputs is also reduced by having separate JINVERT bits for each different type of conditional jump instructions in different word locations of a two-word block.

I claim:

1. Data processing apparatus comprising:
   (a) storage means for storing instructions,
   (b) instruction fetching means for fetching a series of instructions, including conditional jump instructions, from the storage means,
   (c) instructions execution means for executing said series of instructions,
   (d) prediction means for making a jump prediction for a conditional jump instruction, based on an internal attribute of that instruction,
   (e) memory means for storing information identifying conditional jump instructions for which said jump prediction was incorrect on previous instances of execution of those instructions, and
   (f) prediction correction means for correcting said jump prediction before the prediction is acted upon in accordance with said information in the memory means, to produce a corrected jump prediction.

2. Apparatus according to claim 1 wherein said internal attribute is a jump parameter, and wherein said prediction means comprises means for predicting a successful jump when said jump parameter is less than a predetermined value.

3. Apparatus according to claim 1, further including means for deriving a hash address from a jump instruction address, and means for using the hash address to address said memory means.

4. Apparatus according to claim 3 wherein said memory means comprises a plurality of locations, each location being addressed by a particular value of said hash address, wherein each location holds information relating to a plurality of conditional jump instructions of different types.

5. A method of operating a data processing system, the method comprising the steps:
   (a) fetching a series of instructions from an instruction store, the instructions including conditional jump instructions,
   (b) executing the instructions in an execution unit,
   (c) operating a jump prediction unit to make a jump prediction for a conditional jump instruction, the jump prediction being based on an internal attribute of the conditional jump instruction,
   (d) correcting said jump prediction before the prediction is acted upon in accordance with a stored history identifying conditional jump instructions for which said jump prediction was incorrect on previous instances of execution of those instructions.

* * * * *